United States Patent [19]

Collier et al.

[11] 3,971,858

[45] July 27, 1976

[54] EXTRACTING TEA USING AN AQUEOUS SOLUTION OF AMMONIUM BICARBONATE OR AMMONIA

[75] Inventors: Peter Dudley Collier; Alistair Penman, both of Rushden; Frederick John Trussell, Ampthill, all of England

[73] Assignee: Thomas J. Lipton, Inc., Englewood Cliffs, N.J.

[22] Filed: Aug. 30, 1974

[21] Appl. No.: 501,955

[30] Foreign Application Priority Data
Sept. 5, 1973 United Kingdom............... 41649/73
Oct. 26, 1973 United Kingdom............... 50085/73

[52] U.S. Cl................................ 426/597; 426/435
[51] Int. Cl.²......................................... A23F 3/00
[58] Field of Search .......... 426/432, 435, 427, 428, 426/429, 430, 597, 594

[56] References Cited
UNITED STATES PATENTS

| | | | |
|---|---|---|---|
| 964,944 | 7/1910 | Trillich | 426/428 |
| 2,902,368 | 9/1959 | Seltzer et al. | 426/435 |
| 3,080,237 | 3/1963 | Bonotto | 426/435 X |
| 3,155,523 | 11/1964 | Reich | 426/430 |
| 3,163,539 | 12/1964 | Barch | 426/366 X |
| 3,164,474 | 1/1965 | Gianturco et al. | 426/432 X |
| 3,532,506 | 10/1970 | Rene Rey et al. | 426/432 X |
| 3,644,122 | 2/1972 | Yeransian | 426/432 |
| 3,669,680 | 6/1972 | Gurkin et al. | 426/435 X |
| 3,809,769 | 5/1974 | Rivkowich et al. | 426/435 X |
| 3,821,440 | 6/1974 | Reeve | 426/597 X |

FOREIGN PATENTS OR APPLICATIONS

| | | | |
|---|---|---|---|
| 25,211 | 3/1907 | United Kingdom | 426/430 |

*Primary Examiner*—Steven L. Weinstein
*Attorney, Agent, or Firm*—Brumbaugh, Graves, Donohue & Raymond

[57] ABSTRACT

The yield in the aqueous extraction of tea leaf is improved by using an aqueous solution of ammonium bicarbonate or of ammonia as the extractant.

12 Claims, 6 Drawing Figures

EXTRACTING TEA USING AN AQUEOUS SOLUTION OF AMMONIUM BICARBONATE OR AMMONIA

BACKGROUND OF THE INVENTION

Products such as instant tea, for instance cold-water soluble (iced) instant tea, conventionally involve hot-water extraction of tea leaf. Such processes are described by Nicholas Pintauro in Food Processing Review No. 11 published 1970 by Noyes Data Corporation, New Jersey at pages 29 to 63 and reference can particularly be made to Seltzer and Saporito's U.S. Pat. No. 2,902,368. Although excellent products are obtained it has long been appreciated that an improvement in yield, of soluble tea solids, would be highly desirable. Use of temperatures above 100°C leads to improved yields but is costly in energy-requirements and in equipment.

OBJECT OF THE INVENTION

The principal object of the invention is to provide a method of extracting tea leaf in substantially higher yield than that obtained simply using hot-water extraction.

SUMARY OF THE INVENTION

It has been found that if an aqueous solution of ammonium bicarbonate or of ammonia is used to extract soluble solids from tea leaf there is at least about 30% increase in yield based on the yield obtained using water but otherwise the same conditions.

DETAILS OF THE INVENTION

Ammonium bicarbonate or ammonia will aid the aqueous extraction of soluble solids from tea leaf at any temperature. However, in practical terms normally the temperature should be above 50°C and preferably above 90°C. The upper limit for temperature will depend on development of off-flavours and of discoloration and the rate at which the amount of ammonia or, in this case prefaced by decomposition, of ammonium bicarbonate in the extractant decreases for instance by venting to the atmosphere. Normally a temperature of about 200°C would not be exceeded but it will be appreciated that factors, other than temperature, such as time and equipment used, can affect flavor and color and in any case that the acceptability of a product is a subjective question and can depend on its intended use. However 200°C is a useful guide to a maximum temperature. 100°C is a preferred maximum since above that temperature the inconvenience of pressure-vessels is necessitated.

The type of extraction conditions and equipment used is not generally significant as far as the broad invention of the use of aqueous solutions of ammonium bicarbonate or of ammonia is concerned, although the alkaline conditions can make the tea leaf somewhat slippery which makes the use of screw-presses difficult although still possible. Reference can be made to Pintauro's Food Processing Review No. 11, see above, to show how many extraction systems are well-known and available. Systems to which specific details in the following description relate can be characterised generically as A. Countercurrent extraction of fresh leaf.
B. Countercurrent extraction of spent leaf from a previous hot-water extraction of fresh leaf.
C. One-stage extraction of spent leaf from a previous hot-water extraction of fresh leaf.

Even the presence of a slight amount of ammonium bicarbonate or of ammonia will effect an improvement in yield, but for a practical effect a minimum amount of 0.1%, or preferably of 0.5%, by weight of water, is recommended. Lower amounts of ammonia can in general be used than of ammonium bicarbonate. A maximum will often be set by the desire to have little if any ammonia or ammonium bicarbonate in the final extract or product. An advantage of ammonium bicarbonate and ammonia over most other conceivable chemical aids to extraction is that they can leave negligible non-tea residue. But the rate at which the extractant-aid is removed from the system, in the case of ammonium bicarbonate prefaced by decomposition, and hence the preferred maximum amount initially present will depend on both temperature and time and on other factors such as incidental components of the tea leaf. Conveniently a maximum amount is 3%, by weight of water. Probably a more useful base is by weight of tea solids. Using this base a convenient minimum amount of ammonium bicarbonate or of ammonia is 1%, or preferably 5%, since the yield-increment obtained with use of lower amounts is not generally commercially significant. Although ammonium bicarbonate and ammonia are both cheap, there is little benefit to be achieved by using more than 30%, by weight of tea solids, and normally 10% will be a practical limit. For the general extraction technique characterized above as A, if followed by an aroma-stripping step, 10% is also preferred as a practical limit, at least when suggested extraction times and temperatures are used, since otherwise ammonia might well cause problems during isolation of the aroma.

As far as length of extraction time is concerned it will be appreciated that it will depend principally on a balance between energy-costs, e.g. temperature used, and acceptable yield but also on other factors such as the type of equipment and the type of leaf used. Experiment based on personal assessment of desired yield, product quality and acceptable cost is recommended to determine appropriate extraction times for given particular equipment and leaf. As an indication the following times at above 50°C are preferred for the general extraction techniques characterized above used for black tea leaf.

| General Extraction Technique | Time |
|---|---|
| A (using a 3-cell system) | Preferably not less than 5 minutes per cell |
| B | '' |
| C | Using dried spent leaf 15 to 30 minutes. Using normal, wet spent leaf not less than 5 minutes. |

It has been found that the yield will not in general decrease with use of longer times but it also will not increase very significantly and the extra cost of longer times will normally not be justified. It has further been found that the need in some situations to have little if any ammonia in the extract is rarely a complicating factor since, at least when the recommended concentrations of extractants are used, use of times as short as 15 minutes leads to elimination of all but negligible amounts of the extractants.

The tea leaf used can be of any type, such as green, black or oolong but the invention is particularly useful in the extraction of fermented (black) tea leaf. The tea leaf can, but need not, have been fired. The process of the invention can be used as indicated above to extract previously unextracted i.e. fresh tea leaf or to extract spent leaf, that is tea leaf which has previously been extracted for instance with hot water. The tea leaf can be in any degree of division, subject to the requirements of the equipment chosen. The ratio (by weight) of water to tea leaf in the extraction can vary between wide limits. Conveniently it is at least 5 : 1. Particularly in processes involving extraction only with ammonium bicarbonate or ammonia the ratio need not be greater than 15: 1, although ratios for example as high as 25 : 1 are possible. In processes involving two extractions e.g. one with hot water and one with hot aqueous ammonium bicarbonate or ammonia, the ratio of (total) water to leaf can conveniently be as high as 25 : 1. After completion of the extraction, the leaf can be removed, for instance by filtration or centrifugation, and discarded.

When the extraction is counter-current and multi-stage it has been found that a higher yield is obtained if the aqueous solution of ammonium bicarbonate or ammonia is incorporated in the penultimate stage or cell before the leaf leaves the system.

The time and temperature between incorporation of the ammonium bicarbonate or of the ammonia and any aroma-stripping should preferably be such that the aqueous extract immediately prior to the aroma-stripping contains negligible ammonium bicarbonate or ammonia.

Although the process of the invention has the major advantage that it gives a high yield of soluble tea solids and although the extract obtained can be processed conventionally the extract is excessively viscous at least when it is from undried spent leaf. This can cause problems for instance when the extract is to be concentrated for instance prior to spray-drying. Also, when the extract is used to prepare a product soluble in cold hard water, only regrettably low yields of such a product can be obtained. Various modifications, many of them inventive, of the main process have been devised to mitigate these problems. These are described below.

MODIFICATIONS OF THE INVENTIVE PROCESS

It has been found that the component or components, causing the problems, probably high molecular weight tea pectin, should be subjected to a heat-treatment by being heated in aqueous solution or suspension at a pH of 3.5 to 8.5 preferably in the presence of hydrogen peroxide. The pH should preferably be 5 to 8; certainly pHs higher than 8.5 should not be used. This is contrary to normal practice with $H_2O_2$ in the treatment of tea cream where it is used during or after treatment of the cream with alkali. The temperature should be greater than 70°C and preferably greater than 90°C. The hydrogen peroxide should not be added until the solution is at the required temperature. On maximum temperature the same factors apply as in the extraction and similar temperatures are in general appropriate. Length of heat treatment, maximum temperature and amount of any hydrogen peroxide used are so interrelated and dependent on other factors, in particular on the equipment used, that simple experiment should be used to determine appropriate times, maximum temperatures and amounts for a given practical situation although general guidance is given later for the most common situations. With increasing temperature the relative importance of any hydrogen peroxide used decreases. This is because with increasing temperature both the rate at which the hydrogen peroxide decomposes increases and the influence of heat alone increases. The heat treatment is preferably applied after any aroma-stripping step has taken place.

Advantageously the heat treatment is used only on part of the extracted soluble tea solids in which part the offending component has been concentrated.

Such concentration, it has been found, can be achieved for instance by precipitation of tea cream using for instance calcium salts, in particular calcium chloride, broadly as described by Schroeder in U.S. Pat. Spec. No. 2,891,866. The amount of calcium chloride used, calculated as anhydrous calcium chloride, is preferably from 0.5% to 5%, by weight of extracted tea solids. Amounts greater than 2% are particularly preferred. The heat treatment, in this case strongly preferably in the presence of hydrogen peroxide, can conveniently form a preliminary step to an alkaline treatment of the tea cream. (Alkaline treatment to solubilize tea cream is a well-known technique and examples are given for instance in Pintauro's Food Processing Review No. 11, referred to above, at pages 92 to 126.) The amount of hydrogen peroxide used is, by weight of dry tea cream, preferably 20% to 30% and of alkali, e.g. potassium hydroxide, is preferably 10% to 20%.

Alternatively the extract can be subjected to heat-treatment before decreaming. This can occur by adding hydrogen peroxide to the aqueous ammonium bicarbonate or ammonia during the extraction; for instance in a three-cell countercurrent process hydrogen peroxide can be added to the last or penultimate cell that the leaf enters. Alternatively hydrogen peroxide can be added to the hot extract, again before decreaming; suitable conditions include adding 5%, by weight of soluble tea solids, of hydrogen peroxide to the extract at above 70°C and heating the mixture to the boil for 15 minutes. In both cases preferably 2.5% to 10%, by weight of tea solids, of hydrogen peroxide is used; amounts greater than 10% are disadvantageous because of cost. In both cases the treated extract conveniently is then decreamed using amounts of calcium chloride as mentioned and then given a further heat-treatment with hydrogen peroxide followed by an alkali treatment. In this sequence preferred amounts of hydrogen peroxide in the second heat-treatment are 10% to 20% and preferred amounts of alkali, e.g. potassium hydroxide, are also 10% to 20%, each by weight of dry tea cream.

Concentration of the offending component, which as mentioned is preferred, can also be achieved by extracting the tea leaf with hot water as well as with hot aqueous ammonium bicarbonate or ammonia solution. The spent leaf from the one extraction acts as feed for the other. Preferably the leaf is extracted first with the hot water. Only the extract from the extraction with hot aqueous ammonium bicarbonate or ammonia need be given a heat-treatment and it is advantageously given the heat-treatment directly, for instance by addition of, by weight of extracted tea solid, 20% to 30% of hydrogen peroxide and heating to 100°C to 140°C in an autoclave. We would emphasise that these conditions could be modified for instance in a continuous process where less severe conditions would be successful. After treatment of the ammonium bicarbonate or ammonia extract in the autoclave the extracts can conveniently be combined, the mixture decreamed, the tea cream treated conventionally with alkali to solubilize the still cold-water insoluble components and then with hydrogen peroxide to lighten the colour and the treated tea cream added back to the mixture of extracts.

PROPERTIES AND USES OF THE EXTRACTS

The extracts obtained by the processes according to the invention are generally somewhat darker than simple hot water extracts of whole tea, but use of hydrogen peroxide during (or after) extraction, leads to a somewhat lighter colour. When no peroxide is used during extraction, the spent leaf extracts, i.e. the extract according to the invention, of spent leaf from a previous hot-water extraction of fresh leaf, have an alkaline pH of 6.8 – 8.5; when peroxide is used in their preparation, their pHs usually lie in the range 5.5 –8.5. The pH can, if necessary, be adjusted to that of normal tea products, i.e. pH 4.5 – 6, using conventional hot water extracts of whole tea, or a toxicologically acceptable acid (e.g citric or hydrochloric) or both. The method used depends upon the final product desired (see below). The extract obtained from countercurrent extraction of fresh tea leaf according to the invention has been found normally to have a pH in the range 5 to 6.5. When hydrogen peroxide has been used in the extraction the pH has been found to be in the range 4 to 5.5.

Extracts obtained by ammonium bicarbonate extraction of tea leaf can be used in a number of ways, for example:

1a. The extract from the extraction of fresh tea leaf with aqueous ammonium bicarbonate or ammonia can be used, with preferably a heat-treatment as described particularly followed by an alkali treatment to solubilize the cream further, to prepare an instant tea.

1b. The extract obtained by applying the process of the invention to spent leaf can be added to conventional hot water extract of whole leaf after the aroma-stripping stage and an instant tea produced from the combined extracts; a heat treatment of the type described above is preferably applied particularly followed by an alkali treatment to solubilize the cream further.

2. The portion of spent leaf extracts according to the invention that is soluble in cold hard water (the portion can optionally be increased by use of a heat-treatment of the type described above) can be concentrated, preferably after its pH has been adjusted, and freeze- or spray-dried to provide a cold water soluble product which can be used directly or as a base for cold drinks such as a lemon tea drink. By adjusting the pH of the soluble portion of the extract to about neutral and concentrating and freeze- or spray-drying such a base for cold drinks can be transported conveniently.

3. Neutralised spent leaf extract according to the invention can be added in small amounts to conventional hot water extract prior to concentration. The added spent leaf extract enables the final product, instant tea powder, to have the desired bulk density. The amount added ranges from 5 – 40% by weight of the tea solids in the conventional hot water extract. When the amount added is greater than 20% the spent leaf extract should preferably be given a heat-treatment of the type as described above.

The invention will now be illustrated further by the following examples.

EXAMPLE 1

Dried spent tea leaf (50g dry weight) obtained from a hot water 3-cell countercurrent extraction of whole black tea leaf was extracted for 30 minutes with boiling water (500 ml) containing ammonium bicarbonate (1.25, 2.5, 5.0, 10.0 or 25.0g) and hydrogen peroxide (0, 0.5, 1.25, 2.50 and 3.75g).

The leaf/water slurry was centrifuged at 80°C and the insoluble leaf solids discarded. The extract solution was cooled to 20°C and its pH adjusted to 6 with 2N hydrochloric acid. It was then freeze-dried and weighed. The yields and colors of solids obtained are recorded below.

| Weight of bicarbonate (g) per 100g dry spent leaf | Weight of pure $H_2O_2$ per 100g dry spent leaf | Weight of soluble solids extracted (g) | Color of * Extract diluted to 0.1% solids |
|---|---|---|---|
| 2.5 | 0 | 10.78 | 0.497 |
| 5.0 | | 13.30 | 0.577 |
| 10.0 | | 17.02 | 0.565 |
| 25.0 | | 20.00 | 0.606 |
| 2.5 | 0.5 | 10.82 | 0.403 |
| 5.0 | | 13.38 | 0.514 |
| 10.0 | | 17.12 | 0.518 |
| 25.0 | | 20.72 | 0.605 |
| 2.5 | 1.25 | 10.61 | 0.325 |
| 5.0 | | 12.96 | 0.420 |
| 10.0 | | 17.34 | 0.476 |
| 25.0 | | 19.96 | 0.603 |
| 2.5 | 2.50 | 10.06 | 0.265 |
| 5.0 | | 13.14 | 0.346 |
| 10.0 | | 17.04 | 0.450 |
| 25.0 | | 20.92 | 0.582 |
| 2.5 | 3.75 | 9.94 | 0.230 |
| 5.0 | | 14.00 | 0.326 |
| 10.0 | | 16.26 | 0.420 |
| 25.0 | | 18.69 | 0.545 |

* Optical density at 460 nm.

EXAMPLE 2

Whole black tea leaf (100 parts) was extracted with hot water using a 3-cell counter-current extraction system. Water at 95°C entered the system at cell 3 and leaf entered at cell 1.

A water to dry leaf ratio of 10 : 1 was used. A hot water extract of tea (Extract A) having a solids content of 4.5% and containing 33% of the original tea solids (on a dry weight basis) was recovered from cell 1. Spent leaf containing 67% of the original tea solids was recovered from cell 3.

The spent leaf was extracted for 30 minutes at a total liquor : dry tea solids ratio of 10 : 1 with boiling water containing ammonium bicarbonate (6.7 parts, equivalent to 10% by weight of dry spent leaf solids). The centrifuged spent leaf extract (Extract B) had a pH of 8.4 and contained 12 parts tea solubles (18% of dry spent leaf solids, equivalent to 12% of original black leaf) at a concentration of 2.56%.

Extracts A and B were mixed, and concentrated by evaporation under reduced pressure to a solids content of 6.5%. The concentrated mixed extract (Extract C) had a pH of 5.65. Anhydrous calcium chloride (1% by weight of dry tea solids) was dissolved in Extract C, which was then rapidly chilled to 10°C. The precipitated solids (40.3% of the total tea solids) were removed by centrifugation at 10°C, and the solution of decreamed solids (Extract D) set aside.

The insoluble cream was dispersed in water to form a 10% solids slurry, to which was added 8N KOH solution (14% dry weight of KOH on dry cream solids). The slurry was heated to 70°C to dissolve the tea solids, and hydrogen peroxide (20% by weight on dry cream solids) was added. The solution was boiled gently for 10 minutes and cooled to room temperature. The pH of this solubilised cream solution (Extract E) was 7.30.

Extracts D and E were mixed, and the pH of the solution (6.98) adjusted to 6.0 with 2N hydrochloric acid. The haze solids were removed to give a clear dehazed solubilised extract (Extract F) containing 41.3 parts of tea solubles at a concentration of 5.29%.

Dilution of Extract F to beverage strength (0.5%) with hard water gave a beverage of attractive red hue, clarity and taste. Details of similar preparations made using a range of levels of ammonium bicarbonate are given below.

| Bicarbonate used (% of dry spent leaf) | Yield of spent leaf solubles, (% of dry spent leaf) | Yield of cream (% of combined extracted solubles) | Yield of dehazed product (% on dry whole leaf) | Color of dehazed product (0.1% solution) |
|---|---|---|---|---|
| *0 | 0 | 34.34 | 30.29 | 0.283 |
| 2.5 | 10.82 | 33.6 | 35.4 | 0.210 |
| 5.0 | 13.15 | 38.3 | 38.6 | 0.255 |
| 10.0 | 18.0 | 40.25 | 41.3 | 0.360 |
| 25.0 | 20.0 | 38.3 | 42.1 | 0.356 |

*Spent leaf not extracted; only first hot water extract processed.

EXAMPLE 3

Whole black tea leaf (100 parts) was extracted in a counter-current fashion with hot water (as described in Example 2) to yield a hot water extract of tea (Extract A, 33 parts by dry weight) and spent leaf (67 parts by dry weight).

The spent leaf was extracted for 30 minutes at a total liquor: dry tea solids ratio of 10:1 with boiling water containing ammonium bicarbonate (6.7 parts, equivalent to 10% by weight of dry spent leaf solids). The centrifuged spent leaf extract (Extract B) had a pH of 8.4 and contained 12 parts tea solubles (18% of dry spent leaf solids, 12% of original black leaf) at a concentation of 2.56%.

Extracts A and B were mixed, and concentrated by evaporation under reduced pressure to a solids content of 6.5%. The concentrated mixed extract (Extract C) had a pH of 5.9. Anhydrous calcium chloride (1% by weight of dry tea solids) was dissolved in Extract C, which was then rapidly chilled to 10°C. The precipitated solids (40.3% of the total tea solids) were removed by centrifugation at 10°C, and thedecreamed solution (Extract D) set aside.

The insoluble cream was dispersed in water to form a 10% solids slurry, to which was added 8N KOH solution (14% dry weight KOH on dry cream solids). The slurry was heated to 70°C to dissolve the tea solids, and hydrogen peroxide (20%, 25% or 30% by weight on dry cream solids) was added. The solution was boiled gently for 10 minutes and cooled to room temperature to give a solution of solubilised cream (Extract E).

Extracts D and E were mixed, neutralised and dehazed as described in Example 2 to give a clear dehazed solubilised extract F. The yields and colors associated with each level of peroxide used in cream solubilisation are recorded below.

| $H_2O_2$ level % of dry cream solids | Yield of dehazed product (% of whole black leaf) | Dehazing Loss (% of total solubles) | Color of dehazed product (O.D. at 460 nm. of 0.1% solution) |
|---|---|---|---|
| 20 | 41.8 | 7.10 | 0.365 |
| 25 | 42.6 | 6.76 | 0.327 |
| 30 | 41.8 | 7.10 | 0.273 |

EXAMPLE 4

Whole black tea leaf (100 parts) was extracted for 30 minutes with boiling water (1000 parts) containing ammonium bicarbonate (0, 5, or 10 parts).

Those centrifuged extracts whose pH was above 6.0 were neutralised to pH 6.0 with 2N hydrochloric acid. The neutralised extracts were freeze-dried and the solids so obtained were weighed.

| Weight of $NH_4.HCO_3$ used (g) | Yield (g) of soluble solids obtained from 100 g. black leaf |
|---|---|
| 0 | 27.8 |
| 5 | 35.6 |
| 10 | 39.5 |

EXAMPLES 5 to 9

Fresh black tea leaf (100 g lots) was extracted in a 3-cell countercurrent system as shown schematically in FIG. 1, using fresh water (1000 g lots) in cell 3. Ammonium bicarbonate was dissolved in the cold water fed to cell 3. Extraction time in each cell was 5 minutes, timed from the moment at which the temperature of the stirred slurry reached 90°C. Ultimate extraction temperature was 95° – 100°C. Leaf was separated from liquor using a filter press. Equilibrium extraction yields of soluble solids are given below.

|  | Weight of bicarbonate (g) per 100 g fresh leaf | Extract pH | Weight of soluble solids extracted |
| --- | --- | --- | --- |
| Comparison | 0 | 4.93 | 35.2 |
| Example 5 | 1.0 | 5.0 | 38.8 |
| Example 6 | 2.5 | 5.24 | 40.4 |
| Example 7 | 5.0 | 5.72 | 46.8 |
| Example 8 | 7.5 | 6.18 | 45.5 |
| Example 9 | 10.0 | 6.75 | 45.8 |

EXAMPLES 10 to 13

An equilibrium extract prepared as described for Example 7 (i.e. using 5.0 g bicarbonate/100 g fresh leaf) was cooled to 20° – 40°C with stirring, and divided into four equal portions. The desired amount of calcium chloride was added to each portion as a 10% solution with vigorous stirring, which was maintained throughout a subsequent period of cooling to and 30 minutes holding at 10°C. The slurries were then centrifuged to separate the precipitated solids (tea cream). The weights of dry cream solids obtained from 100 g extracted solids and the appearances of the decreamed extracts are given below.

| Ex. | Weight of anhydrous calcium chloride (g)* | Weight of dry cream solids (g)* | Cloud in decreamed extract |
| --- | --- | --- | --- |
| 10 | 1 | 40.3 | ++++ |
| 11 | 2 | 63.2 | ++ |
| 12 | 3 | 61.6 | Clear |
| 13 | 4 | 64.0 | Clear |

*per 100 g extracted solids.

EXAMPLE 14

Fresh leaf (100 g) was extracted as described for Example 7 using 5 g ammonium bicarbonate. 718 g aqueous extract was obtained containing 6.5% dry solids. The extract was cooled to 30°C and a solution of calcium chloride hexahydrate (2.8 g) in water (25 g) was run in with vigorous stirring. The slurry was cooled to 10°C with stirring and maintained at this temperature for 30 min. The slurry was centrifuged to yield 215.1 g of a jelly-like cream containing 27.31 g dry solids and 530.7 g clear decreamed extract containing 20.69 g dry solids. The cream was stirred into water to make a slurry (400 g) which was heated with stirring to 90°C. A 33% solution of hydrogen peroxide (24.6 ml) was added, and the stirred slurry boiled for 15 minutes (30% $H_2O_2$ based on cream). A solution of KOH (4.78 g) in water (6 g) was then added (17.5% KOH based on cream) and the stirred slurry boiled for a further 15 minutes. The weight of slurry was brought up to 400 g with water and the slurry was added back with vigorous stirring to the decreamed extract to yield 930.7 g of addback solution containing 52.2 g dry solids. The addback solution was cooled to 10°C with stirring and after 30 minutes was centrifuged to yield 907.9 g dehazed addback containing 46.7 g dry solids and 22.8 g haze containing 5.5 g dry solids. The dehazed solution was freeze-dried to give a powder which, on reconstitution in cold water at beverage strength, formed a clear tea-coloured solution.

The following Table gives the results obtained using the process described in Example 14 but with the indicated changes Table

| Ex. | Extraction Yield | % Cream | % $H_2O_2$ | % KOH | Yield Powder-Product |
| --- | --- | --- | --- | --- | --- |
| 15 | 45.0 | 58.4 | 30 | 15 | 41.3 |
| 16 | 45.0 | 58.4 | 30 | 20 | 43.5 |
| 17 | 45.0 | 59.1 | 25 | 15 | 42.4 |
| 18* | 45.0 | 59.1 | 25 | 15 | 39.4 |
| 19 | 45.0 | 57.8 | 20 | 26 | 39.7 |
| 20 | 46.1 | 57.9 | 30 | 15 | 41.8 |
| 21 | 44.75 | 55.3 | 25 | 17.5 | 39.9 |

*The order of additions KOH and $H_2O_2$ reversed.

EXAMPLES 22 to 24

Fresh black tea leaf (100 g lots) was extracted in a 3-cell countercurrent system as described for Examples 5 to 9, using aqueous ammonia as extractant in place of aqueous ammonium bicarbonate, and the percentages of ammonia given in the following Table.

| Examples | Weight of $NH_3$/ 100 g fresh leaf | Extract pH | Weight of extracted solids/100 g fresh leaf |
| --- | --- | --- | --- |
| 22 | 5 | 6.75 | 47.53 |
| 23 | 2.5 | 5.70 | 46.31 |
| 24 | 1.25 | 5.27 | 46.81 |

The extracts were decreamed as described for Example 12, using 3% calcium chloride on an extracted solids basis. Yields of cream/100 g extracted solids were as follows:

| Examples | Weight of $NH_3$/ 100 g fresh leaf | Weight of dry cream/ 100 g extracted solids |
| --- | --- | --- |
| 22 | 5 | 59.3 |
| 23 | 2.5 | 58.2 |
| 24 | 1.25 | 57.5 |

EXAMPLE 25

Fresh leaf (100 g) was extracted as described for Example 7 using 5 g ammonium bicarbonate. 650 g aqueous extract was obtained containing 46.7 g dry solids. The extract was heated with stirring to 90°C, a 33% solution of hydrogen peroxide (7 ml) was added, and the stirred solution boiled for 15 min. The extract was cooled and decreamed as described in Example 14 using calcium chloride hexahydrate (2.8 g) in water (25 g) to give 149.4 g cream containing 21.1 g dry solids and 528.4 g decreamed extract containing 27.0 g dry solids.

The cream was stirred into water to make a slurry (300 g) which was heated with stirring to 90°C. A 33% solution of hydrogen peroxide (11.1 ml) was added, and the stirred slurry boiled for 15 min. A solution of KOH (3.17 g) in water (7 g) was added, and the stirred slurry boiled for a further 15 min. The weight of slurry was brought up to 300 g with water, and the slurry was added back with stirring to the decreamed extract to yield 828.4 g addback solution containing 51.1 g dry solids. The addback solution was cooled and dehazed as described in Example 14 to give 800.7 g of dehazed solution containing 44.6 g dry solids and 27.7 g haze containing 6.5 g dry solids. The dehazed solution was freeze-dried to give a powder which, on reconstitution in cold water at beverage strength, formed a clear tea-coloured solution.

EXAMPLE 26

Fresh black leaf (100 g) was extracted in the double countercurrent system shown schematically in FIG. 3. Fresh water was introduced in cell 2 (900 g) and cell 4 (800 g): ammonium bicarbonate (6.6 g) was introduced in cell 4 as a 20% solution once the temperature of the stirred slurry reached 85°C. Extraction time in each cell was 5 minutes, timed from the moment at which the temperature of the cell contents reached 85°C. Ultimate extraction temperature was 95° – 100°C. At equilibrium cell 1 gave 694 g extract (E1) containing 34.0 g dry solids; cell 3 gave 723 g extract (E2) containing 12.3 g dry solids. Extracts E1 and E2 were concentrated by evaporation under reduced pressure to 6% solids. At 33% solution of hydrogen peroxide (7.4 ml) was added to Extract E2, which was autoclaved at 140°C for 30 minutes.

Extracts E1 and E2 were then combined, and calcium chloride hexahydrate (2.78 g) in water (25 ml) was added with vigorous stirring to the combined extract at 30°C. The slurry formed was cooled to 10°C with stirring and after 30 minutes was centrifuged to give a decreamed extract containing 18.5 g dry solids.

The cream was dispersed in water to form a 10% solids slurry, to which was added KOH (2.41 g) in water (5.2 g). The slurry was heated with stirring to 70°C and a 33% solution of hydrogen peroxide (11.1 ml) was added. The slurry was boiled for 10 minutes and added back to the decreamed extract. The addback solution was cooled with stirring to 10°C and after 30 min. was centrifuged to give a dehazed extract (740 g) containing 44.0 g dry solids.

EXAMPLE 27

Fresh black leaf (100 g) was extracted in the system shown schematically in FIG. 4. Fresh water was introduced in cell 1 (900 g) and cell 4 (800 g): ammonium bicarbonate (6.6 g) was introduced in cell 3 as a 20% solution once the temperature of the stirred slurry reached 85°C. Time and temperature of extraction were as specified in Example 26. At equilibrium, cell 1 gave extract E1 containing 33.2 g dry solids; cell 2 gave extract E2 containing 16.7 g dry solids. Extracts E1 and 2 were concentrated under reduced pressure to 6% solids. A 33% solution of hydrogen peroxide (15 ml) was added to Extract E2, which was autoclaved at 140°C for 30 minutes.

Extracts E1 and E2 were then combined and decreamed using calcium chloride hexahydrate (3.0 g) as described in Example 26. Decreamed extract containing 34.9 g dry solids and cream containing 15.0 g dry solids were obtained.

The cream was treated with KOH (2.85 g) and 33% $H_2O_2$ (11.25 ml) was described in Example 26, and the treated cream added back to the decreamed extract and dehazed to give a solution containing 48 g dry solids.

EXAMPLE 28

Fresh black tea leaf (100 g) was extracted in a 3-cell counter-current system as shown schematically in FIG. 5. Cold fresh water (1000 g) containing ammonium bicarbonate (5 g) was introduced in cell 3. A 33% solution of $H_2O_2$ (15 ml) was added in cell 3 once the temperature of the stirred leaf slurry reached 80°C. Extraction times and temperatures were ad detailed for Example 7. 663 g aqueous extract containing 50.4 g dry solids was obtained. The extract was cooled to 30°C and a solution of calcium chloride hexahydrate (3.04 g) in water (50 g) was run in with vigorous stirring. The stirred slurry was cooled to 10°C and centrifuged after 30 min. to give 220 g cream containing 25.5 g dry solids and 487 g decreamed extract containing 26.4 g dry solids. The cream was stirred into water to give a slurry (400 g) which was heated with stirring to 90°C. A 33% solution of $H_2O_2$ (9.5 ml) was added, and the stirred slurry boiled for 15 minutes. A solution of KOH (3.82 g) in water (4 g) was then added, and the stirred slurry boiled for a further 15 minutes. The weight of the slurry was brought up to 400 g with water, and the slurry added back with vigorous stirring to the decreamed extract to yield 887 g addback solution containing 55.1 g dry solids. The addback solution was cooled to 10°C and centrifuged to give 831 g dehazed solution containing 49.5 g dry solids and 56 g haze containing 5.6 g dry solids. The dehazed solution was freeze-dried to give a powder which, on reconstitution in cold water at beverage strength, formed a clear tea-coloured solution.

EXAMPLE 29

Fresh black tea leaf (100 g) was extracted in the counter-current system shown schematically in FIG. 6. Cold fresh water (1000 g) containing ammonium bicarbonate (5 g) was introduced in cell 3. A 33% solution of $H_2O_2$ (15 ml) was added in cell 2 once the temperature of the stirred leaf slurry reached 80°C. Extraction times and temperatures were as detailed for Example 7. 737 g extract containing 51.2 g dry solids was obtained. The extract was decreamed using calcium chloride hexahydrate (3.08 g) in water (50 g) (as described in Example 28) to give 270 g cream containing 26.35 g dry solids and 520 g decreamed extract containing 26.35 g dry solids. The cream was stirred into water to give a slurry (320 g) which was treated sequentially with 33% $H_2O_2$ (10 ml) and KOH (3.3 g in 4 g water) as described in Example 28. The treated slurry was added back to the decreamed extract to give 840 g addback solution containing 56.2 dry solids. The addback solution was dehazed at 10°C to give 822 g dehazed solution containing 49.7 g dry solids and 18 g haze containing 6.5 g dry solids. Freeze-drying of the dehazed solution gave a powder which, on reconstitution at beverage strength in cold water, gave a clear tea-coloured solution.

Figure 1:
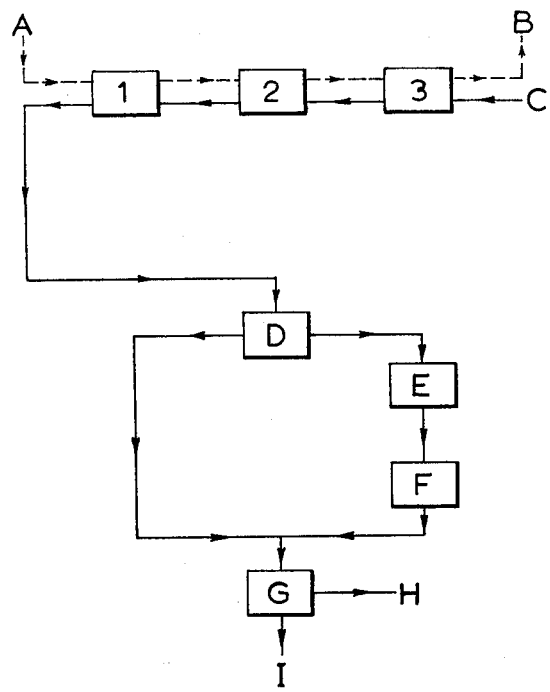
FIG. 1
Figure 2:
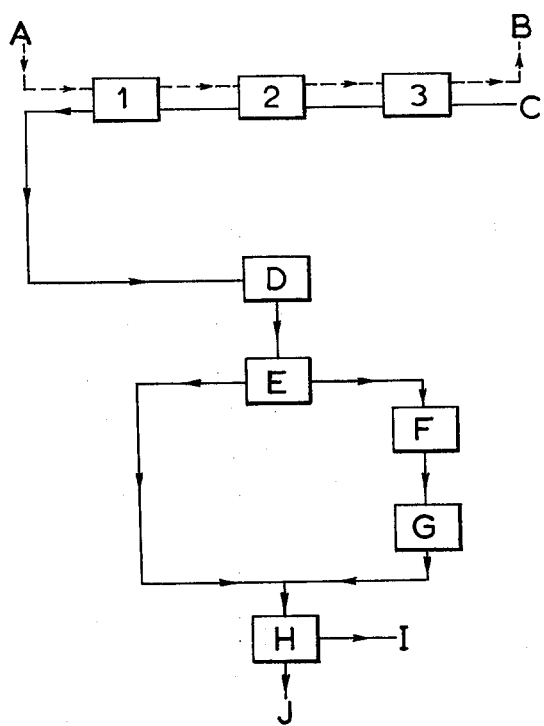
Figure 3:
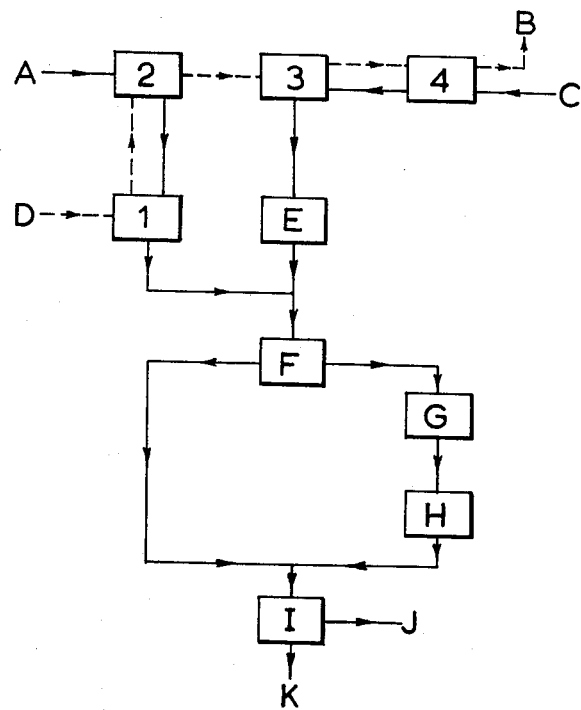
Figure 4:
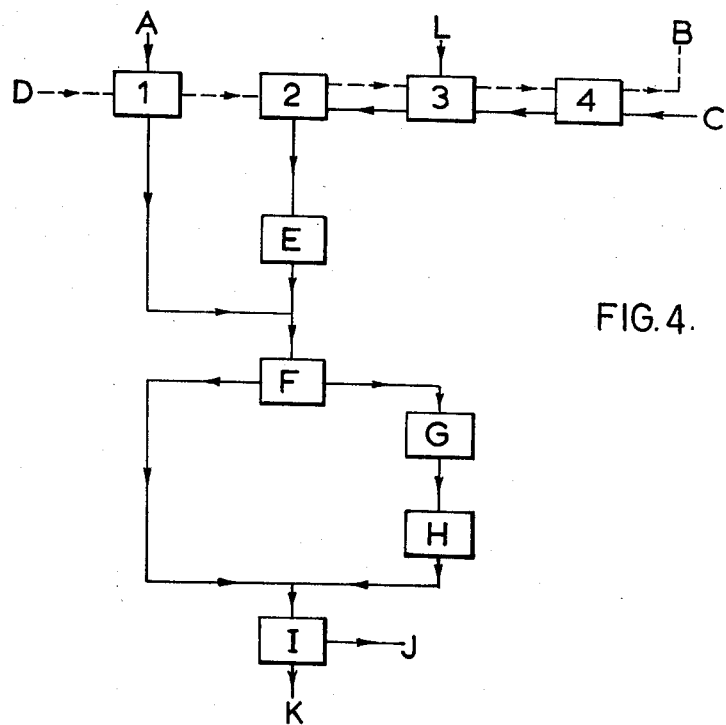
Figure 5:
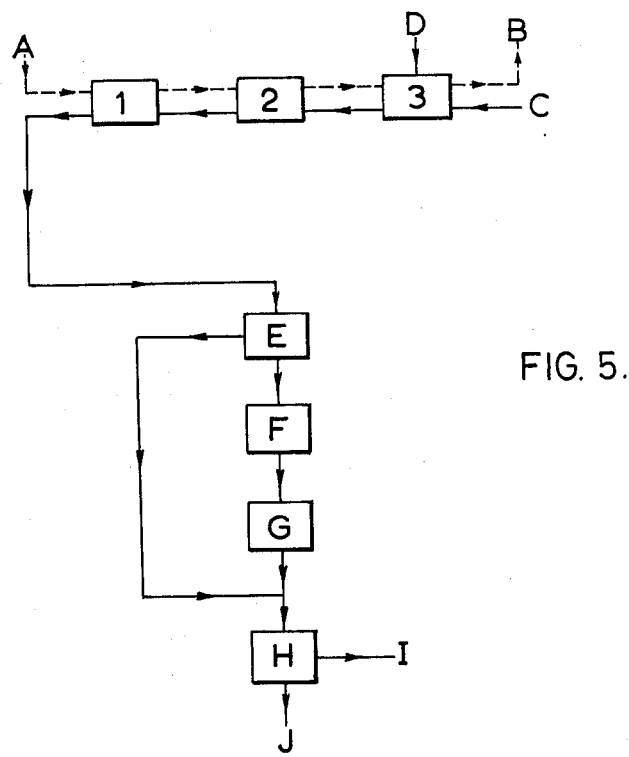
Figure 6:
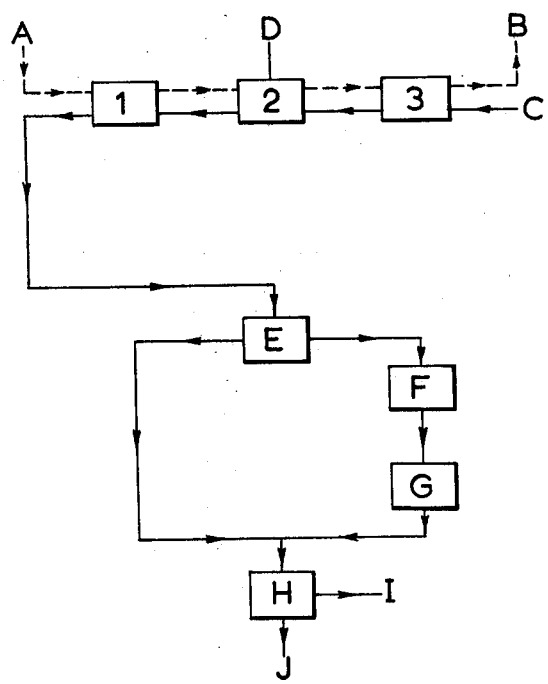

An aqueous solution C of ammonium bicarbonate or of ammonia and tea leaf A are passed countercurrently through three cells 1, 2 and 3 where the leaf is extracted with the aqueous solution. Exhausted leaf B is discarded or treated further. The extract is decreamed D. The tea cream is dispersed in water and heat-treated E as described in the body of the specification, preferably using hydrogen peroxide. It is then treated with alkali F. The solubilized tea cream is combined with the decreamed extract from the decreaming stage D and dehazed G. The haze H is discarded. The extract obtained is indicated as I.

Suitable conditions for the various stages, where they are not conventional, are indicated in the specification and, for instance, Example 5 illustrates such a process.

FIG. 2

An aqueous solution C of ammonium bicarbonate or of ammonia and tea leaf A are passed countercurrently through three cells 1, 2 and 3 where the leaf is extracted with the aqueous solution. Exhausted leaf B is discarded or treated further. The extract is heat-treated D as described in the body of the specification, preferably using hydrogen peroxide. It is then decreamed E.

The tea cream is given a heat-treatment F as described in the body of the specification, preferably using hydrogen peroxide. It is then treated G with an alkali. The solubilized tea cream is combined with the decreamed extract from the decreaming stage E and dehazed H. The haze I is discarded. The extract obtained is indicated as J.

Suitable conditions for the various stages, where they are not conventional, are indicated in the specification and, for instance, Example 25 illustrates such a process.

FIG. 3

Tea leaf D is countercurrently extracted with hot water A in two cells 1 and 2. The spent leaf from this extraction is countercurrently extracted with an aqueous solution C of ammonium bicarbonate or of ammonia in a further two cells 3 and 4. The exhausted leaf B is discarded or treated further. The extract from the extraction with ammonium bicarbonate or ammonia is concentrated and heat-treated E as described in the body of the specification, preferably using hydrogen peroxide. It is then combined with the extract from the hot-water extraction and decreamed F.

The tea cream is given an alkali-treatment G and is then treated with hydrogen peroxide H. The solubilized tea cream obtained is combined with the decreamed extract from the decreaming stage F and dehazed I. The haze J is discarded. The extract obtained is indicated as K.

Suitable conditions for the various stages, where they are not conventional, are indicated in the specification and, for instance, Example 26 illustrates such a process.

FIG. 4

Tea leaf D is extracted with hot water A in a cell 1. The spent leaf from the cell 1 is extracted countercurrently in three cells 2, 3 and 4. Water C is fed to cell 4 and an aqueous solution L of ammonium bicarbonate or of ammonia is added at cell 3. The exhausted leaf B is discarded or treated further.

The extract from cell 2 is heat-treated E as described in the body of the specification, preferably using hydrogen peroxide. It is then combined with the extract from cell 1 and decreamed F. The tea cream is given an alkali-treatment G and then treated with hydrogen peroxide H. The solubilized tea cream is combined with the extract from the decreaming stage F and dehazed I. The haze J is discarded. The extract obtained is indicated as K.

Suitable conditions for the various stages, where they are not conventional, are indicated in the specification and, for instance, Example 27 illustrates such a process.

FIG. 5

Tea leaf A is countercurrently extracted with an aqueous solution C of ammonium bicarbonate or of ammonia in three cells 1, 2 and 3. Aqueous hydrogen peroxide D is added to the aqueous solution in cell 3. The exhausted leaf B is discarded or treated further. The extract from cell 1 is decreamed E. The tea cream is dispersed in water and heat-treated F as described in the body of the specification, preferably using hydrogen peroxide. It is then treated with alkali G. The solubilized tea cream is combined with the decreamed extract from the decreaming stage E and dehazed H. The haze I is discarded. The extract obtained is indicated as J.

Suitable conditions for the various stages, where they are not conventional, are indicated in the specification and, for instance, Example 28 illustrates such a process.

FIG. 6

Tea leaf A is countercurrently extracted with an aqueous solution C of ammonium bicarbonate or of ammonia in three cells 1, 2 and 3. Aqueous hydrogen peroxide D is added to the aqueous solution in cell 2. The exhausted leaf B is discarded or treated further. The extract is decreamed E. The tea cream is dispersed in water and heat-treated F as described in the body of the specification, preferably using hydrogen peroxide. It is then treated with alkali G. The solubilized tea cream is combined with the decreamed extract from the decreaming stage E and dehazed H. The haze I is discarded. The extract obtained is indicated as J.

Suitable conditions for the various stages, where they are not conventional, are indicated in the specification and, for instance, Example 29 illustrates such a process.

What is claimed is:

1. A method of obtaining a tea extract containing soluble tea solids in substantially higher yields than obtained by simple hot water extraction, comprising the steps of extracting tea leaves with an aqueous solution of a material selected from the group consisting of ammonium bicarbonate and ammonia to produce an aqueous tea extract, separating the extracted leaves from the aqueous tea extract and discarding the leaves.

2. A method according to claim 1 in which the extract is given a heat-treatment at a pH 3.5 to 8.5 and a temperature greater than 73°C by addition of hydrogen peroxide to the extract when it is already at a temperature greater than 70°C.

3. A method according to claim 1 in which tea leaf is first extracted with hot water and then with an aqueous solution of ammonium bicarbonate or ammonia and the extract obtained by extracting with an aqueous solution of ammonium bicarbonate or ammonia is given a heat-treatment at a pH 3.5 – 8.5 and a temperature greater than 70°C by addition of hydrogen peroxide to the extract when it is already at a temperature greater than 70°C.

4. A method according to claim 1 in which the tea leaves are spent tea leaves and the extract obtained is added back to an extract obtained by extracting fresh tea leaves with hot water only after the latter extract has been subjected to an aroma-stripping stage.

5. A method according to claim 4 in which 5% – 40%, by weight of the hot water extract, of the ammonium bicarbonate or ammonia extract is added to the hot water extract and the ammonium bicarbonate or ammonia extract has been given, before being added to the hot water extract, a heat-treatment at a pH 3.5 – 8.5 and a temperature greater than 70°C by addition of hydrogen peroxide to the extract when it is already at a temperature greater than 70°C.

6. A method according to claim 1, in which tea cram is precipitated from the extact by adding thereto, by weight of tea solids, 0.5%–5% calcium chloride, and the precipitated tea cream is thereafter subjected to a heat treatment at a pH of 3.5 to 8.5 and a temperature greater than 73°C.

7. A method according to claim 6 in which the tea cream after the heat-treatment is treated with strong alkali.

8. A method according to claim 1, in which, during the last or penultimate stage of the extraction procedure, the extract is given a heat treatment at pH 3.5 to 8.5 and a temperature greater than 73° C., accompanied by addition thereto of hydrogen peroxide, while the extract is at a temperature greater than 70° C.

9. A method according to claim 8 in which the extract after heat-treatment is decreamed, and the tea cream is then given a heat-treatment at a pH of 3.5 – 8.5 and a temperature greater than 70°C by addition of hydrogen peroxide to the extract when it is already at a temperature greater than 70°C and the tea cream is then treated with alkali.

10. A method according to claim 1 in which the tea leaves are extracted at a temperature above 50°C and not more than 200°C with, by weight of tea solids, not less than 1% and not more than 30% of ammonium bicarbonate or of ammonia for at least 15 minutes, the ratio of water to tea leaf being at least 5 : 1 and not greater than 25 : 1.

11. A method according to claim 10 in which the extraction is counter-current.

12. A method according to claim 11 in which the extraction is multistage and the ammonium bicarbonate or ammonia is added in the penultimate stage before the tea leaf leaves the multi-stage extraction.

\* \* \* \* \*